US011097629B2

(12) United States Patent
Krammer et al.

(10) Patent No.: US 11,097,629 B2
(45) Date of Patent: Aug. 24, 2021

(54) CHARGING CONNECTION DETECTION

(71) Applicant: Bayerische Motoren Werke Aktiengesellschaft, Munich (DE)

(72) Inventors: Josef Krammer, Holzkirchen (DE); Joachim Goethel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 613 days.

(21) Appl. No.: 14/998,148

(22) Filed: Dec. 23, 2015

(65) Prior Publication Data
US 2016/0207412 A1 Jul. 21, 2016

Related U.S. Application Data

(63) Continuation of application No. PCT/EP2014/063325, filed on Jun. 25, 2014.

(30) Foreign Application Priority Data

Jun. 26, 2013 (DE) ..................... 10 2013 212 221.7

(51) Int. Cl.
*B60L 53/60* (2019.01)
*B60L 3/04* (2006.01)
(Continued)

(52) U.S. Cl.
CPC ................ *B60L 53/60* (2019.02); *B60L 3/04* (2013.01); *B60L 11/1846* (2013.01);
(Continued)

(58) Field of Classification Search
CPC .............. B60L 11/1846; B60L 11/1848; B60L 11/1844; B60L 11/1838; B60L 11/1816;
(Continued)

(56) References Cited

U.S. PATENT DOCUMENTS 9,024,579 B2    5/2015  Igata
2009/0091291 A1*  4/2009  Woody .................... B60K 6/48
320/109
(Continued)

FOREIGN PATENT DOCUMENTS

EP    1 995 109 A1     11/2008
WO   WO-2011154815 A2 * 12/2011  .......... B60L 11/1816
WO   WO 2013/063306 A1  6/2013

OTHER PUBLICATIONS

Chinese Office Action issued in Chinese counterpart application No. 201480032661.0 dated Feb. 12, 2018 (Nine (9) pages).
(Continued)

*Primary Examiner* — Richard Isla
*Assistant Examiner* — Manuel Hernandez
(74) *Attorney, Agent, or Firm* — Crowell & Moring LLP

(57) ABSTRACT

A system includes a power withdrawal point on a power supply network and a vehicle for the corded charging of a traction battery at the power withdrawal point. The vehicle includes a charging electronics unit for charging, and is electrically connectable to the vehicle-external power withdrawal point via a charging cable. The charging cable is configured as a cable connected outside the vehicle to a station charging device for a charging process, or as a cable charging device. The station charging device or the cable charging device, respectively, is electrically connected to the power withdrawal point when a charging connection has been established, and the power withdrawal point can supply an alternating current respectively via the station charging device or via the cable charging device for charging. The station charging device or the cable charging device, respectively, is electrically connected to the charging electronics unit via a pilot line when the charging connection has been established, where the charging process is controllable by an electric pilot signal applied via the pilot line. The charging (Continued)

electronics unit detects physical parameters of the pilot signal via the pilot line, physical parameters of the power supply network at the power withdrawal point via the charging current lines, and physical parameters of the station charging device or of the cable charging device via the pilot line, respectively, during a charging process so as to produce a parameter data set characterizing the power withdrawal point.

15 Claims, 1 Drawing Sheet

(51) Int. Cl.
  *B60L 53/65* (2019.01)
  *B60L 53/30* (2019.01)
  *B60L 53/18* (2019.01)
  *B60L 53/14* (2019.01)
  *B60L 53/63* (2019.01)
  *B60L 53/66* (2019.01)
  *H02J 7/00* (2006.01)
  *B60L 11/18* (2006.01)

(52) U.S. Cl.
  CPC ............... *B60L 53/14* (2019.02); *B60L 53/18* (2019.02); *B60L 53/305* (2019.02); *B60L 53/63* (2019.02); *B60L 53/65* (2019.02); *B60L 53/66* (2019.02); *B60L 53/665* (2019.02); *H02J 7/00036* (2020.01); *H02J 7/00045* (2020.01)

(58) Field of Classification Search
  CPC .......... B60L 11/1824; B60L 3/04; B60L 3/00; B60L 2230/12; B60L 2230/16; B60L 53/66; B60L 53/65; B60L 53/305; B60L 53/18; B60L 53/14; B60L 53/63; B60L 53/665; B60L 53/60; H02J 7/0004; H02J 2007/0001; H02J 7/00036; H02J 7/00045; Y02T 90/128; Y02T 90/14; Y02T 90/121; Y02T 90/163; Y02T 10/7088; Y02T 10/7005
  USPC .................................................. 320/106, 109
  See application file for complete search history.

(56) References Cited

U.S. PATENT DOCUMENTS

| | | | |
|---|---|---|---|
| 2009/0210357 A1* | 8/2009 | Pudar | B60L 11/1816 705/412 |
| 2009/0259603 A1* | 10/2009 | Housh | B60L 11/1818 705/412 |
| 2010/0280675 A1* | 11/2010 | Tate, Jr. | H01M 10/44 700/295 |
| 2011/0004406 A1* | 1/2011 | Davis | B60L 11/1842 701/300 |
| 2011/0127956 A1* | 6/2011 | Mitsutani | B60K 6/365 320/109 |
| 2011/0213780 A1* | 9/2011 | Suganuma | B60L 3/12 707/740 |
| 2011/0288721 A1 | 11/2011 | Christensen et al. | |
| 2012/0078553 A1* | 3/2012 | Kuroda | B60L 3/0046 702/63 |
| 2012/0123670 A1* | 5/2012 | Uyeki | B60L 11/1838 701/300 |
| 2012/0139489 A1 | 6/2012 | Gaul et al. | |
| 2012/0161925 A1* | 6/2012 | Gale | B60L 3/0046 340/5.28 |
| 2013/0031121 A1* | 1/2013 | Sera | G06Q 10/00 707/758 |
| 2014/0028257 A1* | 1/2014 | Nishida | B60L 11/1816 320/109 |

OTHER PUBLICATIONS

PCT/EP2014/063325, International Search Report dated Dec. 5, 2014 (Two (2) pages).

* cited by examiner

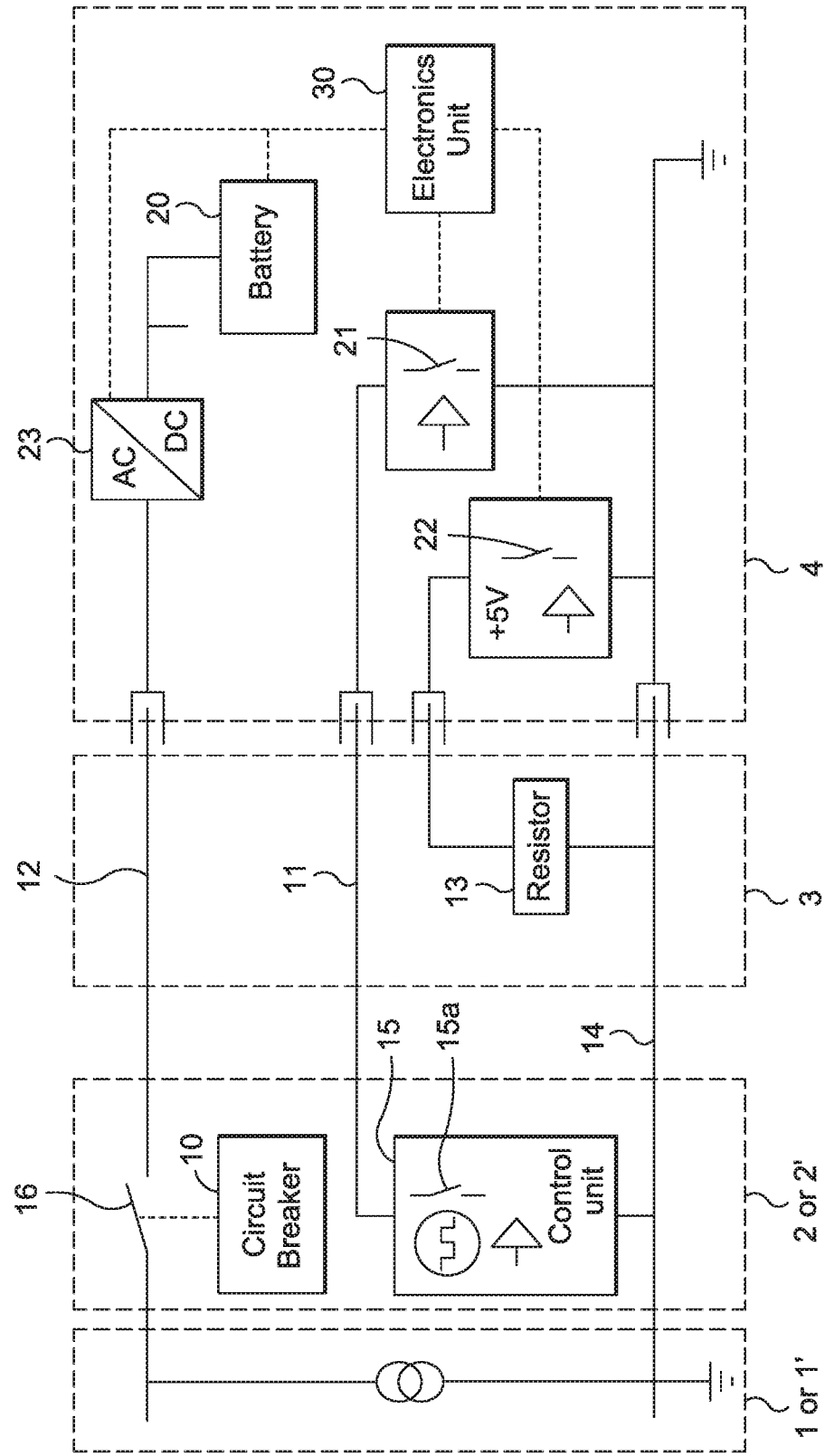

CHARGING CONNECTION DETECTION

CROSS REFERENCE TO RELATED APPLICATIONS

This application is a continuation of PCT International Application No. PCT/EP2014/063325, filed Jun. 25, 2014, which claims priority under 35 U.S.C. § 119 from German Patent Application No. 10 2013 212 221.7, filed Jun. 26, 2013, the entire disclosures of which are herein expressly incorporated by reference.

BACKGROUND AND SUMMARY OF THE INVENTION

The invention relates to a system comprising a power withdrawal point on a power supply network and comprising a vehicle for the corded charging of a traction battery of the vehicle at the power withdrawal point, wherein the vehicle has a charging electronics unit for charging, and the vehicle can be electrically connected to the vehicle-external power withdrawal point via a charging cable for the charging process.

Vehicles comprising an electrified drive train, which are designed for corded charging on an external power source, are referred to as plug-in vehicles and are typically designed as electric or hybrid vehicles comprising a traction battery.

Charging of the traction battery takes place in a charging process in terms of both function and time. The term 'charging process' is broadly defined in the related art. Definitions that exclusively relate to the flow of electrical power are common, as are definitions that, for example, cover the process of visiting a power source before the actual charging connection between the vehicle and the power source is established, or that cover billing for the charging process by a power provider after the charging connection has been terminated. This document is geared to the comprehensive understanding of the term 'charging process.'

An electrical connection between the vehicle to be charged and a power withdrawal point is established by a charging cable in the form of a charging connection. The related art describes interfaces between the vehicle and the power withdrawal point, which provide signal pins on the vehicle and power withdrawal point, and a signal conductor in the charging cable, so as to establish a signal line between the vehicle and power withdrawal point. This signal line is referred to as control pilot or pilot line according to exemplary standard ISO 15118.

In addition, even more complex interface systems are known, see document EP 2459409 A2, for example, which provide digital data communication between the vehicle and the power withdrawal point via the charging cable, which is referred to as power line communication (PLC) or PL communication. PL communication is used, for example, to identify the terminal of the particular charging partner, which is to say, by means of the PL communication, the particular vehicle can be authenticated with respect to the particular power withdrawal point, and vice versa, in the form of characteristic, transmittable data packets once the charging connection is established when a plurality of vehicles and a plurality of power withdrawal points are present.

It is an object of the invention to describe an improved system, comprising a power withdrawal point on a power supply network and comprising a vehicle for the corded charging of a traction battery of the vehicle at the power withdrawal point, wherein the vehicle has a charging electronics unit for charging, and the vehicle can be electrically connected to the vehicle-external power withdrawal point via a charging cable for the charging process.

According to one aspect of the invention, the charging cable can be connected to a station charging device for a charging process, or the cable comprises a cable charging device, wherein the station charging device or the cable charging device is electrically connected to the power withdrawal point when a charging connection has been established, and the power withdrawal point can supply an alternating current via the station charging device or via the cable charging device for charging the traction battery, the supplied alternating current is conducted from the station charging device or from the cable charging device over charging current lines of the charging cable for charging, the station charging device or the cable charging device is electrically connected to the charging electronics unit via a pilot line when the charging connection has been established, the charging process can be controlled by an electric pilot signal that can be applied via the pilot line, and the charging electronics unit detects physical parameters of the pilot signal via the pilot line, physical parameters of the power supply network at the power withdrawal point via the charging current lines, and physical parameters of the station charging device or of the cable charging device via the pilot line during a charging process so as to produce a parameter data set of the power withdrawal point.

This means that, when the charging connection has been established, the charging electronics unit detects physical parameters of the power withdrawal point in the form of analog data via the pilot conductor and/or via the charging current conductors, so as to characterize the power withdrawal point with respect to the charging-specific properties thereof.

According to an embodiment of the invention, the vehicle comprises a GPS-based navigation system, and the parameter data set additionally includes location data of the power withdrawal point.

In this way, the technical information about the power withdrawal point is supplemented with location information about the power withdrawal point.

It is furthermore useful if the location data can be detected by the GPS navigation system, and the location data can be detected by way of driving route identification when a GPS signal is not available.

This is particularly important when the power withdrawal point is located in a GPS signal shadow area. Such a situation arises when the power withdrawal point is located in an underground parking lot or on a middle or lower deck of a parking garage, for example.

In the case of driving route identification, the vehicle ascertains the location position upon entering the signal shadow area based on the detection of steering movements and the distance traveled. The current location results as the end point of the driving route since the time at which the vehicle entered the signal shadow area. Floor identification in parking garages or underground parking lots is possible by detecting the positions of pedals of the vehicle. For example, when changing floors going up, the gas pedal must be actuated more strongly for a distance at the same speed than when driving the same distance horizontally. When changing floors going down, for example, the brake pedal must be actuated for a distance at the same speed, compared to coasting horizontally at the same speed.

According to one or more embodiments of the invention, the produced parameter data set can be stored by the charging electronics unit as part of a characterization data set for the particular power withdrawal point in a memory of the charging electronics unit or a central vehicle memory.

This means that the ascertained parameters characterizing the power withdrawal point are stored in the vehicle.

The characterization data set can be supplemented with information that goes beyond the detected parameters of the parameter data set. This information includes, for example, the charging duration at the particular power withdrawal point, error events such as an interruption of power output or a subjective assessment of the charging process at the power withdrawal point by the user, which can be objectified by a plurality of users and charging processes (example of an assessment: "I would come to this charging station again.").

Furthermore, an overall system comprises a plurality of such power withdrawal points and a plurality of such vehicles, wherein a characterization data set about a particular power withdrawal point of the plurality of power withdrawal points can be stored by the charging electronics unit of a respective vehicle.

In this way, each vehicle of the plurality of vehicles is able to store characterization data sets about multiple power withdrawal points as the number of charging processes rises.

It is particularly advantageous when a vehicle compares the produced parameter data set to stored characterization data sets during a charging process, and the charging electronics unit generates an identification signal for a characterization data set that corresponds to the parameter data set.

In this way, it is possible to identify or recognize a particular power withdrawal point based on the comparison of the detected parameter data set to the characterization data sets stored in the vehicle. The comparison therefore establishes an association of the particular vehicle with the particular power withdrawal point.

According to one or more embodiments, the comparison of the parameter data set to the characterization data sets is preferably carried out according to a statistical classification method.

The classification is preferably carried out for individual parameters from the parameter data set or characterization data set one parameter at a time. In this way, power withdrawal points stored with characterization data sets can be excluded during the identification process in a manner that conserves computing resources. For example, if a group of characterization data sets exists which have a comparable or similar charge internal resistance as the exemplary parameter, which is to say which form a class in terms of the parameter 'internal resistance,' and the identified internal resistance of the parameter set is outside this class, any power withdrawal points within this class would no longer necessarily have to be considered in the further comparison. The comparison process can therefore be carried out efficiently, and a successful identification may potentially already take place after a few individual parameters have been detected. Moreover, the quality of the classification can be assessed by the classifier and used as a decision-making criterion in the identification.

It is moreover useful if the charging process can be controlled in an optimized manner with respect to a charging strategy when an identification signal is generated.

This is useful in particular when the characterization data set of the identified power withdrawal point contains information that, as such, is relevant only relatively late during the charging process or even only after the charging process. This information goes beyond the information content of the parameter data set. If it was ascertained by the vehicle, for example based on earlier charging processes, and stored in the characterization data set that a charging connection at the particular power withdrawal point is established over a very long period of time in a plurality of processes (for example when charging always occurs overnight), this information is already known for this power withdrawal point during the successful comparison at the beginning of the particular charging process and can be taken into consideration in the charging operation strategy. Charging can then take place, for example, at a lower rate or during preferred phases of the presumably long period of time over which the charging connection is established.

By identifying the power withdrawal point at the beginning of the charging process, the vehicle or the charging electronics unit can therefore adapt the charging rate and the charging times to specifics of the power withdrawal point. In this way, it is also possible to implement a variant, for example, according to which a power withdrawal point blocks power output at certain times when load peaks in the power supply network are known, and the vehicle generates a message, for example in the form of a push notification, to a smart phone of the vehicle user, in addition to adapting the charging operation.

An interruption in the charging process may be allowed at this power withdrawal point, while this would result in an error message at another charging point.

According to one or more embodiments of the invention, the charging process is billed by the power provider with respect to the identified power withdrawal point when an identification signal is generated.

Moreover, characterization data sets can be exchanged between vehicles of the overall system via means for data communication.

In this way, it can be achieved that a characterization data set about a power withdrawal point, which was detected by another vehicle and is transmitted to the particular vehicle, can be stored in a vehicle. It is therefore possible to store a characterization data set in the particular vehicle at a point in time before a charging process is carried out with the particular vehicle for the first time at this power withdrawal point. Interconnectedness and an exchange within a number of vehicles therefore results in "intelligence" of this number of vehicles.

The invention is based on the considerations described hereafter:

There is no universal method available today which ensures the ability to identify the power withdrawal point, which is to say the charging station or the power outlet or wall box or in-cable control box, to which an electric vehicle or a plug-in hybrid vehicle is connected. It is therefore not traceable when a particular vehicle was charged at which power withdrawal point.

Two special approaches are known from the prior art in which identification is possible. One of these is a mutual authentication of the power withdrawal point and the vehicle, for example using power line communication according to the prior art.

Another approach shows identification by way of a chip card at the power withdrawal point. However, this still does not make it possible to directly infer the power withdrawal point from the vehicle, because the chip card is not one-to-one associated with a vehicle, which is to say the chip card can be transferred across persons and vehicles.

An improved variant is proposed, which is more universally applicable than the special approaches and enables an association between the vehicle and the power withdrawal point. This variant goes beyond simple positioning of the vehicle (and power withdrawal point) by way of GPS coordinates. Simple GPS positioning is not sufficient because in particular charging locations at parking spaces or parking lots are frequently situated next to each other, and consequently customary positioning according to the prior art does not offer sufficient resolution for this purpose, or is not available in the first place in underground parking lots or parking garages, potentially comprising multiple levels, due to signal shielding.

Other parameters or data must therefore be drawn on, which enable a unique association between the vehicle and the power withdrawal point at a power withdrawal point having no digital interface (such as having no power line (PL) communication). When PL communication is used, certificates can be exchanged in encrypted form safe from manipulation, which allows an identification of the particular vehicle with respect to the particular power withdrawal point. Moreover, additional data, such as the amount of current, time, provider and billing information, and the like, can be transmitted.

The alternative solution is therefore of high technical relevance because the majority of power withdrawal points for electric vehicles or plug-in hybrid vehicles from today's view does not have PL communication, and consequently no unique association exists. The other parameters relate to location information and characterization data of the particular charging points, which can be smartly evaluated and combined with each other.

The advantages of a unique association are multifaceted and range from the operating strategy during charging to billing modalities of the charging process. For example, the charging current can be adapted to the charging point when a power withdrawal point is recognized.

Moreover, the charging time can be selected in a cost-optimizing manner, since a particular charging time may be selected as being preferred during the plug-in phase to the station, for example when the electricity price is dependent on the charging point. Furthermore, the power bill can be generated not only in a vehicle-based manner, but also based on the power withdrawal point.

Moreover, it is possible to caution about error messages, for example, which may have occurred during earlier charging processes at this power withdrawal point. If data connections exist between vehicles, it is possible to exchange information about power withdrawal points between the vehicles. When a third-party vehicle approaches or plugs into a power withdrawal point identified as defective, a message that immediately points out the defect may be output.

A preferred exemplary embodiment of the invention will be described hereafter based on the accompanying drawings. Further details, preferred embodiments and refinements of the invention will be derived from this. In the drawing schematically in detail:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a detail of a plug-in vehicle and a power withdrawal point.

DETAILED DESCRIPTION OF THE DRAWINGS

FIG. 1 shows a detail of the onboard electrical system (4) of a vehicle comprising an electrified drive train, which includes a high-voltage battery (20). The high-voltage battery can be charged at a power withdrawal point of an external alternating current network (1) with the aid of an on-board charger (23), which converts the alternating current from the alternating current network into direct current.

For charging, a corded charging connection is established between the vehicle and the power withdrawal point. For this purpose, essentially a charging cable is needed, which comprises several electrical conductors. These are power conductors (collectively denoted by reference numeral 12) for phase conductors and for a neutral conductor. Additionally, these are a pilot line (11) and a protective conductor (14).

The charging cable has a charging connector (3), which comprises pins for the particular conductors for contact closure with the vehicle-side pin contacts. The charging connector moreover comprises a proximity resistor (13), which can be connected to the protective conductor on the vehicle-side via the switch (22). The charging connector or the charging cable can be characterized by the type or the value of the proximity resistor. The vehicle can "poll" the proximity resistor by switching the switch (22). The switching can be controlled by a charging electronics unit (30) of the vehicle.

The functionality of the proximity resistor and of the pilot line can correspond to the specifications of standard ISO 15118, for example. Without the use of digital electronics between the power withdrawal point and the vehicle, the pilot line makes it possible for very simple charging systems to control a charging process by way of a pulse width-modulated signal (PWM signal) having a voltage level of essentially +/−12 volts and a frequency of essentially 1 kHz.

During a charging process, the external power supply network initially charges a charging device (2), which is designed as a wall box or alternatively as an in-cable control box, with electric power. A residual current circuit breaker (FI, 10) and a control unit (15) are located in the wall box or the in-cable control box for applying a pulse width-modulated signal. When the vehicle is connected, the pulse width-modulated signal is applied by the switch (15a). A wall box is a unit that is mounted in a stationary manner and connected to the power supply network and to which the charging cable can be connected by the power withdrawal point. An in-cable control box is an integral part of the charging cable itself, which can, in turn, be directly connected to the power supply network at the power withdrawal point. The wall box or in-cable control box can be designed according to standard SAE J 1772, for example, and reports to the vehicle the maximum current that can be withdrawn over a duty cycle of the pulse width-modulated signal. In the present exemplary embodiment, a wall box shall be assumed hereafter, without limiting the general nature.

The wall box feeds the pulse width-modulated signal to the pilot line via the control unit, the signal being returned in the vehicle to the protective conductor via a pilot unit (21), which is essentially composed of a settable resistor, a switch, and a diode. The vehicle can request a charging approval from the pilot line via the settable resistor of the pilot unit. The charging readiness of the vehicle is indicated after a self-check of the vehicle was successfully carried out. Only when the charging readiness of the vehicle is indicated can a relay (16) in the wall box or in the in-cable control box be connected so as to enable electrical power to flow. In this way, it can be prevented that supply voltage is applied to a defective vehicle.

The vehicle moreover comprises the charging electronics unit (30). The charging electronics unit controls and monitors the charging process. In addition, the charging electronics unit detects parameters in a parameter data set which are characteristic of the particular power withdrawal point, such as a public power outlet from a number of power outlets on a floor of a park-and-ride parking garage.

These parameters include, for example, activation and deactivation times of the pulse width-modulated signal, the frequency of the pulse width-modulated signal, the maximum charging current, and the internal resistance of the individual phases.

Each of the parameters is detected differently. For example, the activation and deactivation times of the pilot signal can be measured in that the charging electronics unit measures the duration within which the current path is switched by the power withdrawal point after a signal change has occurred (such as switching of the 1 kHz signal by the vehicle using the switch (15a)). The vehicle, for example, signals its charging readiness, and the wall box or the in-cable control box connects the supply voltage to the vehicle via the relay. The vehicle measures the time from the transmission of the charging readiness to the application of the alternating voltage.

The frequency of the PWM signal can be measured by measuring the number of pulses over an extended time period. Since the charging electronics unit can ascertain the time with sufficient accuracy, it is possible to detect the individual frequency deviation over the extended time period.

An exact measurement of voltage thresholds of the pilot signal can be used alternatively or additionally to distinguish between different power withdrawal points.

One method for measuring the internal resistance is, for example, to consecutively switch the charging current off and on several times and to measure the fluctuation of the supply voltage. The internal resistance of the power withdrawal point can be determined via the measured voltage difference. The accuracy can also be increased by averaging across several measurements. Ascertaining the internal resistance is expedient anyhow, so as to provide overload protection for poorly connected power withdrawal points.

The ascertained parameters are stored as a characterization data set in the charging electronics unit. The characterization data set can additionally include location information from a navigation and route identification system of the vehicle. Simple GPS positioning is not sufficient because conventional positioning according to the prior art does not offer sufficient local resolution and, in addition, the GPS signal may be shielded, using the exemplary embodiment of a public power outlet from a number of power outlets on a floor of a park-and-ride parking garage. For this reason, GPS positioning is supplemented with driving route identification in the selected exemplary embodiment. By way of the steering movements and the distance driven by the vehicle, it is possible to ascertain the stopping location of the vehicle as the end point of the driving route even without GPS reception. A change of floors in the park-and-ride parking garage can be detected by way of the engine and braking power, for example so as to associate a charging process taking place later with a power withdrawal point on a particular floor. With respect to the specific embodiment of the navigation and driving route identification system, navigation and driving route identification systems according to the prior art may be used.

Ideally, a distinction is made between parameters that relate to the power terminal per se, such as internal resistance and GPS coordinates, and parameters that are also influenced by the charging cable, such as properties of the pilot signal. This is the prerequisite to be able to identify a power withdrawal point also when using different charging cables.

If the vehicle is associated with any arbitrary power withdrawal point (1') or any arbitrary wall box (2') from a plurality of power withdrawal points and wall boxes for a charging process, the charging electronics unit detects the parameter data set for this power withdrawal point and compares the parameter data set to the characterization data sets stored in this vehicle. Without limiting the general nature, this comparison is carried out by a control unit of the power electronics unit or by a control unit associated with the power electronics unit and is based on a classifier of appropriate quality. The classification is carried out sequentially parameter by parameter to ensure it is carried out in a manner that conserves computing resources. If, for example, the value of the attribute "activation time pilot signal" of the particular power withdrawal point is part of a class of the stored power withdrawal points with a minimum degree of classification quality with respect to this parameter, all other power withdrawal points may be omitted from the further comparison.

A positive comparison is established when, with respect to key parameters of the parameter data set, the particular power withdrawal point coincides with a stored power withdrawal point with a minimum degree of classification quality.

The essential advantage of this is that the characterization data set comprises a larger number of parameters about the particular power withdrawal point than the parameter data set ascertained at the beginning of the charging process. This means that the charging electronics unit can already use the additional parameters that the characterization data set comprises at the beginning of the charging process as a result of the positive comparison.

Such essential parameters are, for example, information about errors regarding the particular power withdrawal point, which developed during the course of earlier charging processes at this power withdrawal point. Moreover, an automatic association between the vehicle and the power withdrawal point simplifies billing with the power provider at the particular power withdrawal point.

As a result of the association, furthermore statistical evaluatability, for example with respect to the charging frequency and the charging behavior of the vehicle at particular power withdrawal points, can be made possible. This is advantageous for larger fleet operators, for example, to optimize the charging logistics within the entire fleet.

As a result of the association, it is also possible for service staff of the manufacturer or operator of the power withdrawal point or for service staff of the vehicle manufacturer, for example, to establish retrospectively at which power withdrawal point charging problems occurred, and ideally, why a problem occurred there. This improves the servicing options for the charging infrastructure.

Moreover, the vehicle user can read out the characterization data sets, for example via a data connection of the vehicle (such as Bluetooth synchronization), and the characterization data sets can be available to an Internet-based community platform. By way of a car-to-car data connection, it is furthermore possible to directly exchange the characterization data sets with other vehicles. Both variants cause the characterization data sets to be storable in a vehicle, without a charging process of the vehicle having been conducted at this point in time at the particular power withdrawal points.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising a power withdrawal point on a power supply network and comprising a vehicle for a corded charging process of a traction battery of the vehicle at the power withdrawal point, the vehicle having a charging electronics unit for charging, and the vehicle being electrically connectable to the vehicle-external power withdrawal point via a charging cable for the corded charging process, wherein
the charging cable is configured as one of (i) a cable connected outside the vehicle to a station charging device for the corded charging process, and (ii) a cable charging device;
the station charging device or the cable charging device is respectively electrically connected to the power withdrawal point when a charging connection has been established, and such connected power withdrawal point can supply an alternating current for charging via the station charging device or via the cable charging device, respectively;
the supplied alternating current is respectively conducted from the station charging device or from the cable charging device over charging current lines of the charging cable for charging;
the station charging device or the cable charging device is respectively electrically connected to the charging electronics unit via a pilot line when the charging connection has been established;
the corded charging process is controllable by an electric pilot signal applied via the pilot line; and
the charging electronics unit detects physical parameters of the pilot signal via the pilot line, physical parameters of the power supply network at the connected power withdrawal point via the charging current lines, and physical parameters of the station charging device or of the cable charging device via the pilot line, respectively, during the corded charging process so as to produce a parameter data set characterizing the connected power withdrawal point,
wherein the charging electronics unit is configured to identify which of a plurality of power withdrawal points the connected power withdrawal point is based on the parameter data set.

2. The system according to claim 1, wherein
the vehicle comprises a GPS-based navigation system; and
the parameter data set includes location data of the power withdrawal point.

3. The system according to claim 2, wherein
the location data is detectable by the GPS navigation system; and
the location data is detectable by way of driving route identification when a GPS signal is not available.

4. The system according to claim 3, wherein
the produced parameter data set is stored by the charging electronics unit as a characterization data set of the power withdrawal point in a memory of at least one of the charging electronics unit and a central vehicle memory.

5. The system according to claim 2, wherein
the produced parameter data set is stored by the charging electronics unit as a characterization data set of the power withdrawal point in a memory of at least one of the charging electronics unit and a central vehicle memory.

6. The system according to claim 1, wherein
the produced parameter data set is stored by the charging electronics unit as a characterization data set of the power withdrawal point in a memory of at least one of the charging electronics unit and a central vehicle memory.

7. A system, comprising:
the plurality of power withdrawal points according to claim 1;
a plurality of vehicles according to claim 1; and
a characterization data set about a particular one of the plurality of power withdrawal points stored by the charging electronics unit of a respective one of the plurality of vehicles.

8. The system according to claim 7, wherein
one of the plurality of vehicles compares produced parameter data set to the stored characterization data set during the corded charging process; and
the charging electronics unit generates an identification signal for the characterization data set that corresponds to the produced parameter data set.

9. The system according to claim 8, wherein
the comparison of the produced parameter data set to the stored characterization data set is carried out according to a statistical classification method.

10. The system according to claim 8,
wherein
the corded charging process is controlled in an optimized manner with respect to a charging strategy when an identification signal is generated.

11. The system according to claim 8, wherein
the corded charging process is billed by the power provider with respect to the identified power withdrawal point when an identification signal is generated.

12. The system according to claim 8, wherein
the characterization data set is exchanged between at least two vehicles of the plurality of vehicles via data communication.

13. The system according to claim 7, wherein
the characterization data set is exchanged between at least two vehicles of the plurality of vehicles via data communication.

14. The system according to claim 1,
wherein the produced parameter data set is compared to a plurality of stored characterization data sets corresponding to the plurality of power withdrawal points, and
wherein the charging electronics unit is configured to identify the connected power withdrawal point from among the plurality of power withdrawal points based at least in part on said comparing of the produced parameter data set to the plurality of stored characterization data sets.

15. The system according to claim 14,
wherein a unique association, which identifies the particular vehicle with respect to the connected power withdrawal point, is established based at least in part on said comparing of the produced parameter data set to the plurality of stored characterization data sets.

* * * * *